US008997059B2

United States Patent
Wang et al.

(10) Patent No.: US 8,997,059 B2
(45) Date of Patent: Mar. 31, 2015

(54) REVERSE DEBUGGING

(71) Applicant: International Business Machines Corporation, Armonk, NY (US)

(72) Inventors: Fan Wang, Beijing (CN); Qi Li, Beijing (CN); Jiu Chang Du, Beijing (CN); Xiao Ling Chen, Beijing (CN); Li Gang Mei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/952,751

(22) Filed: Jul. 29, 2013

(65) Prior Publication Data

US 2014/0033181 A1    Jan. 30, 2014

(30) Foreign Application Priority Data

Jul. 30, 2012  (CN) .......................... 2012 1 0267108

(51) Int. Cl.
*G06F 9/44* (2006.01)
*G06F 11/36* (2006.01)

(52) U.S. Cl.
CPC .......... *G06F 11/362* (2013.01); *G06F 11/3644* (2013.01)
USPC ...................................................... 717/129

(58) Field of Classification Search
CPC ........................ G06F 11/362; G06F 11/3664
USPC ............................................... 717/129
See application file for complete search history.

(56) References Cited

U.S. PATENT DOCUMENTS

| | | | |
|---|---|---|---|
| 5,167,012 A * | 11/1992 | Hayes et al. .................... | 706/60 |
| 7,836,430 B2 | 11/2010 | Shebs | |
| 8,090,989 B2 | 1/2012 | Law et al. | |
| 8,136,096 B1 | 3/2012 | Lindahl et al. | |
| 8,423,956 B2 * | 4/2013 | Banavar et al. ................ | 717/120 |
| 8,756,577 B2 * | 6/2014 | Bates ............................ | 717/125 |

(Continued)

OTHER PUBLICATIONS

Maruyama et al., "Debugging with Reverse Watchpoint", 2003, IEEE.*

(Continued)

*Primary Examiner* — Wei Zhen
*Assistant Examiner* — Junchun Wu
(74) *Attorney, Agent, or Firm* — William A. Kinnaman, Esq.; Kevin P. Radigan, Esq.; Heslin Rothenberg Farley & Mesiti P.C.

(57) ABSTRACT

A method and reverse debugger are provided for reversely debugging a program. The method includes: obtaining debugging information of the program as outputted by a compiler, the debugging information including information related to extended basic blocks of the program; in response to the program entering into reverse debugging, setting a reverse debugging checkpoint at an entry address of at least one extended basic block; in response to the program reaching a set reverse debugging checkpoint, storing information required by debugging that corresponds to the reverse debugging checkpoint; in response to receiving a set reverse debugging target breakpoint, making the program return to a reverse debugging checkpoint located before the reverse debugging target breakpoint and nearest to the reverse debugging target breakpoint, obtaining information required to be stored by the debugging stored at the reverse debugging checkpoint, and continuing to execute the program till the reverse debugging target breakpoint.

18 Claims, 7 Drawing Sheets

(56) References Cited

U.S. PATENT DOCUMENTS

| | | | |
|---|---|---|---|
| 8,789,023 B2* | 7/2014 | Lindahl et al. | 717/129 |
| 2004/0268315 A1* | 12/2004 | Gouriou et al. | 717/129 |
| 2008/0148237 A1* | 6/2008 | Jiang et al. | 717/124 |
| 2008/0270988 A1* | 10/2008 | Li et al. | 717/125 |
| 2011/0016358 A1 | 1/2011 | Randimbivololona et al. | |
| 2011/0061043 A1* | 3/2011 | Rydh et al. | 717/131 |
| 2012/0174077 A1* | 7/2012 | Lindahl et al. | 717/128 |
| 2014/0033178 A1* | 1/2014 | Sasikumar | 717/125 |

OTHER PUBLICATIONS

Pan et al., "Supporting Reverse Execution of Parallel Progranls", 1988, ACM, pp. 124-129.*

Visan et al., "URDB: A Universal Reversible Debugger Based on Decomposing Debugging Histories", Oct. 2011, ACM.*

Gottbrah, "Reverse Debugging with the TotalView Debugger", 2008, Cray User Group Conference.*

Sosic, Rok, "History Cache: Hardware Support for Reverse Execution", Newsletter ACM SIGARCH Computer Architecture News, vol. 22, Issue 5, Dec. 1994 (pp. 11-18).

Wang et al., "An Effective Reversible Debugger of Cross Platform Based on Virtualization", Embedded Software and Systems, 2009. ICESS '09 International Conference, May 25-27, 2009, English Abstract (1 page).

Vulov et al., "Reverse Computing Computer Technology", School of Computational Science & Engineering, Project No. 118116, Publisher: Georgia Institute of Technology, 2010/2011 (15 pages).

* cited by examiner

```
COMPILE_UNIT<header overall offset = 0>
<0><  11> dw_tag_compile_unit      0
           DW_AT_stmt_list          0
           DW_AT_HP_actuals_stmt_list  0
           DW_AT_macro_info         0
           DW_AT_name               xxx/init.C
           DW_AT_producer
           DW_AT_lanugage           DW_LANG_C_plus_plus
           DW_AT_HP_proc_per_section  yes(1)
           DW_AT_comp_dir           /home/yadvecha/ISLHPIA02/RTWIN/730
```

FIG. 4A

```
Line number information at line program offset 0
<source>              [ row,col] <pc> <BB entry> <new statement or basic block>
cd_scoped/tests/a1.C [ 238, 1] 0x98 // begin of prologue
cd_scoped/tests/a1.C [ 238, 1] 0x102 // end of prologue
cd_scoped/tests/a1.C [ 247, 5] 0x10e 0x10e // Basic block entry
cd_scoped/tests/a1.C [ 248, 1] 0x126 0x10e // new statement
cd_scoped/tests/a1.C [ 248, 1] 0x144 0x10e
cd_scoped/tests/a1.C [ 248, 1] 0x14a 0x10e
cd_scoped/tests/a1.C [ 249, 1] 0x14e 0x10e
cd_scoped/tests/a1.C [ 250, 1] 0x152 0x10e
cd_scoped/tests/a1.C [ 251, 1] 0x156 0x156 // Basic block entry
cd_scoped/tests/a1.C [ 252, 1] 0x162 0x156 // begin of epilogue
cd_scoped/tests/a1.C [ 253, 5] 0x180 0x156 // begin of prologue
cd_scoped/tests/a1.C [ 253, 5] 0x1da 0x156 //
cd_scoped/tests/a1.C [ 256, 9] 0x1de 0x156 // new statement
cd_scoped/tests/a1.C [ 256, 9] 0x1ee 0x156
cd_scoped/tests/a1.C [ 256, 9] 0x1fa 0x156
cd_scoped/tests/a1.C [ 257, 6] 0x1fe 0x1fe // Basic block entry
cd_scoped/tests/a1.C [ 258, 1] 0x212 0x1fe // begin of epilogue
cd_scoped/tests/a1.C [ 0, -1] 0x230 // begin of prologue
cd_scoped/tests/a1.C [ 0, -1] 0x278 // end of prologue
cd_scoped/tests/a1.C [ 0, -1] 0x290 // begin of epilogue
```

FIG. 4B

| <BB entry> | <EBB entry> |
|---|---|
| 0x100 | 0x100 |
| 0x156 | 0x100 |
| 0x184 | 0x100 |
| 0x272 | 0x100 |
| 0x362 | 0x362 |
| 0x440 | 0x362 |
| 0x890 | 0x362 |

FIG. 5

<------- check point 1 (recording r1-r32, original mem 1 = 11)

[1] r4 <- r1 + 7

[2] r5 <-r4 - 6 <--------- reverse debugging target breakpoint

[3] [mem1] = r5 <---- memory changes

[4] r7 <-[mem2]

<------- check point 2 (recording r1-r32, original mem 4 = 12)

........

[10] r5 < - r4 / r2

[11] r4 <- r5 * 6

[12] [mem4] = r1 <---- memory changes

[13] r3 <-[mem5]

..........

<------- check point 3 (recording r1-r32, recording r1-r32, original mem 4 = 12)

[21] ........

[mem5] <- r5 + 7

... ......

[mem6] <- r8 + 9

[23] ........

<--- stop

FIG. 6

REVERSE DEBUGGING

PRIOR FOREIGN APPLICATION

This application claims priority from Chinese patent application number CN 2012-10267108.8, filed Jul. 30, 2012, which is hereby incorporated herein by reference in its entirety.

TECHNICAL FIELD

The present invention relates to a program debugger, and more specifically, to a reverse debugger and a method for reverse debugging.

BACKGROUND

A common debugger has the following basic functions: interrupting a running program by making a target program trigger an abnormity, and executing the target program according to a user's will; looking up software runtime information, such information including, but not limited to, register information and memory information of the current thread; and modifying software execution flows, including: modifying memory information, register information, etc.

The working principle of the debugger is that based on an abnormal mechanism of a central processor, an abnormity distribution (or event distribution) sub-system of an operating system is responsible for packaging the abnormity (or event), and then performing a real-time interaction with the debugger in a relatively friendly manner. When the debugger captures an abnormity (or event), it will determine whether it is necessary to take over the abnormity (or event) based on the inherent logic of the debugger and then it will determine which function of the debugger takes it over. After the debugger takes over this abnormity (or event), further processing will be made as required by the user, and after completion of the processing, the system is notified that the processing is completed, and then a new round of abnormity (or event) capturing and distribution will be started.

During the process of program debugging, a programmer usually has to know whether he/she has gone too far in program debugging, whether the execution result of a previous step is right, and so on, which needs to use a reverse debugging technique. Reverse debugging is a debugging scheme in a debugger. This scheme allows a program to return to historical points where the program has been executed. At present, debuggers providing a reverse debugging function include: TotalView Debugger of TotalView Technologies, and GDB of an open source community.

Theoretically, if a program intends to return to a historical point where it has been executed, the state of the historical point should be recorded, including memory values and register values related to the historical point and the program. The existing schemes for implementing reverse debugging functions either require too much memory space or take too much time to reach a reverse target breakpoint.

SUMMARY

In order to solve the problems existing in the prior art, it is desirable to provide a reverse debugger and a reverse debugging method, which results in a reasonable memory space as required and less time for reaching a reverse debugging target breakpoint.

According to one embodiment of the present invention, there is provided a method of reversely debugging a program, comprising: obtaining debugging information of the program as outputted by a compiler, the debugging information comprising information related to extended basic blocks of the program; in response to the program entering into a reverse debugging, setting a reverse debugging checkpoint at an entry address of at least one extended basic block; in response to the program reaching a set reverse debugging checkpoint, storing information required to be stored by debugging that corresponds to the debugging checkpoint; in response to receiving a set reverse debugging target breakpoint, making the program return to a reverse debugging checkpoint that is located before the reverse debugging target breakpoint and nearest to the reverse debugging target breakpoint, obtaining information required to be stored by the debugging as stored by the reverse debugging checkpoint, and continuing to execute the program till the reverse debugging target breakpoint.

According to another embodiment of the present invention, there is provided a reverse debugger, comprising: an obtaining module configured to obtain debugging information of a program as outputted by a compiler, the debugging information comprising information related to extended basic blocks of the program; a setting module configured to in response to the program entering into a reverse debugging, set a reverse debugging checkpoint at an entry address of at least one extended basic block; a storing module configured to in response to the program reaching a set reverse debugging checkpoint, store information required to be stored by debugging that corresponds to the reverse debugging checkpoint; a returning module configured to in response to receiving a set reverse debugging target breakpoint, make the program return to a reverse debugging checkpoint that is located before the reverse debugging target breakpoint and nearest to the reverse debugging target breakpoint, obtain information required to be stored by the debugging stored at the reverse debugging checkpoint, and continue to execute the program till the reverse debugging target breakpoint.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4a shows an entry for debugging information in Dwarf debugging information, and FIG. 4b shows an example of information in a Dwarf format as generated by a compiler;

FIG. 5 schematically shows information of extended basic blocks as added in debugging information according to one embodiment of the present invention;

FIG. 6 shows an embodiment of information required to be stored by a debugger at a reverse debugging checkpoint;

DETAILED DESCRIPTION

Various embodiments will be described in more detail below with reference to the accompanying drawings, in which certain embodiments of the present disclosure have been illustrated. However, the present disclosure can be implemented in various manners, and thus should not be construed to be limited to the embodiments disclosed herein. On the contrary, the embodiments provided are for the thorough and complete understanding of the present disclosure, and completely conveying the scope of the present disclosure to those skilled in the art.

Figure 1:
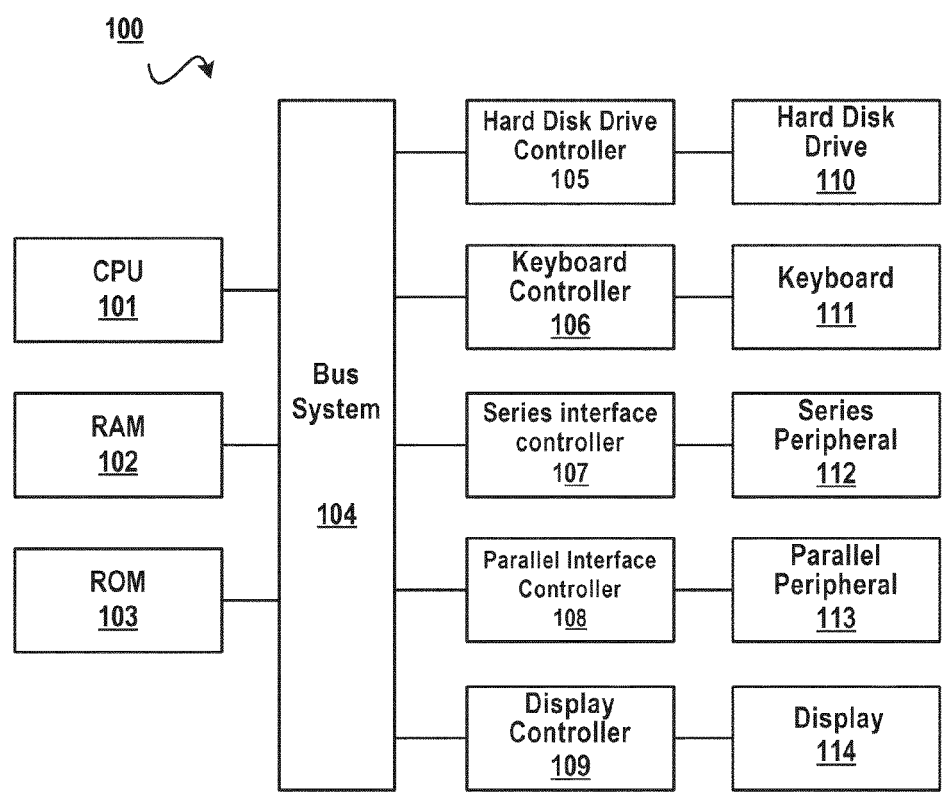
FIG. 1 shows a block diagram of an exemplary computer system which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

First, common background technical terms are described below. They are used in the present invention.

Breakpoint: during a program debugging process, a breakpoint refers to a stop location inside the program, aiming to, for example, print variant values and memory locations and look up internal information of the system at a certain location inside the program for the sake of user debugging. A breakpoint is generally manually set by a user and visible to the user. A specific implementation is using a trap instruction to replace an instruction of setting a breakpoint in a debugger of the program, storing the instruction of setting the breakpoint, such that when the program is executed to the trap instruction, an abnormity occurs, and the program control right is handed over to the operating system.

Checkpoint: it is a special breakpoint, and its implementation principle is the same as the breakpoint. The checkpoint mainly aims to record one of following items: memory changes and register changes. The checkpoint is generally automatically set by a debugger and may be invisible to the user.

Reverse debugging checkpoint: a point set by a debugger during a reverse debugging to store an intermediate state of a program.

Reverse debugging target breakpoint: a point to which the program has to return and set by a debugger on a program execution path during a reverse debugging.

The existing reverse debugging has provided some schemes, for example including: a one-step-one-stop scheme, a target breakpoint scheme. According to the one-step-one-stop scheme, the debugger is required to set a reverse debugging checkpoint at a next instruction with respect to the current instruction, and when the program stops at the current instruction, the debugger is required to record the register values as modified by the present instruction and the changed values of relevant memory locations, and record these values in a storage medium, so as to restore these values instruction by instruction when they are required to be restored. According to this scheme, each instruction has to stop running, and thus the execution speed is very slow; further, a large memory space is required for the register values and the values of relevant memory changes modified by each instruction.

The target breakpoint scheme means the program automatically or manually sets a certain amount of reverse debugging checkpoints; if the program intends to debug reversely to a reverse debugging target breakpoint, the following steps are generally required:

a) the debugger inserts a certain amount of reverse debugging checkpoints. The insertion approaches are divided into dynamic insertion and static insertion. The static insertion means inserting the reverse debugging checkpoints into the program before the program runs; the dynamic insertion means inserting the reverse debugging checkpoints during the program running process.

b) restoring the program to reverse debugging checkpoints that are located nearest to a plurality of reverse debugging target breakpoints and before the reverse debugging target breakpoints, and the restoring to the reverse debugging checkpoints is also divided into automatic restoring and manual restoring; the manual restoring requires the user to designate which reverse debugging checkpoint the program is restored to.

c) executing forwardly from the restored checkpoints to the reverse debugging target breakpoints.

The breakpoint insertion approaches include: an approach of setting a designated function entry, i.e., inserting reverse debugging checkpoints at a designated function entry or at each function entry; for an arbitrary target point, this approach is far insufficient in terms of the amount of reverse debugging checkpoints, and it is hard to reach an arbitrary reverse debugging target breakpoint rapidly; setting a certain amount of instruction spacing, for example, inserting a reverse debugging checkpoint every n pieces of instructions; however, the instruction spacing according to this approach is hard to determine; at the entry of each piece of basic block, inserting a reverse debugging checkpoint, wherein the pieces of instructions for many basic blocks are less than 5; thus, the reserve debugging checkpoints as inserted according to this approach are too many, which requires a large memory space.

Thus, the problem to be solved for inserting reverse debugging checkpoints is the insertion granularity, because if the granularity of inserting reverse debugging checkpoints is too small, the spatial cost for reaching the target breakpoint is too great; while if the granularity of inserting reverse debugging checkpoints is too large, the time cost for reaching the target point is too great.

Figure 2:
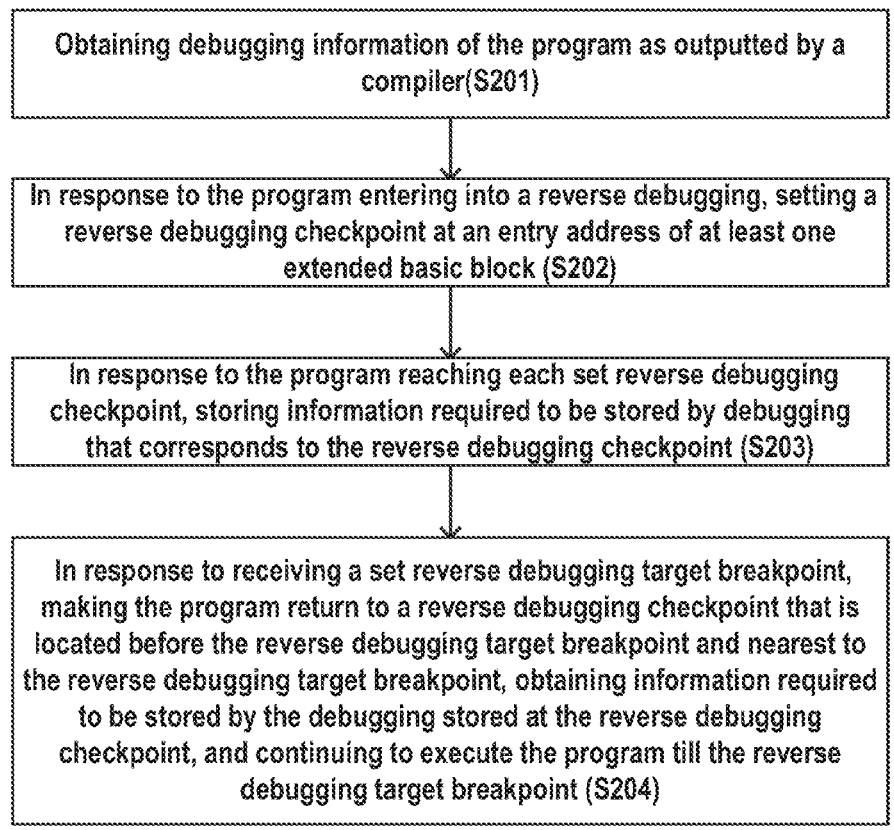
FIG. 2 shows a flowchart of a method for reversely debugging a program according to one embodiment of the present invention.

The present invention can reduce information required to be stored by reverse debugging and thereby improve debugging efficiency. The present invention proposes using extended basic blocks as the breakpoint insertion granularity for reverse debugging. FIG. 2 shows a flowchart of a method for reversely debugging a program according to one embodiment of the present invention. According to FIG. 2, in step S201, debugging information of the program as outputted by a compiler is obtained, the debugging information comprising information related to extended basic blocks of the program.

Figure 3:
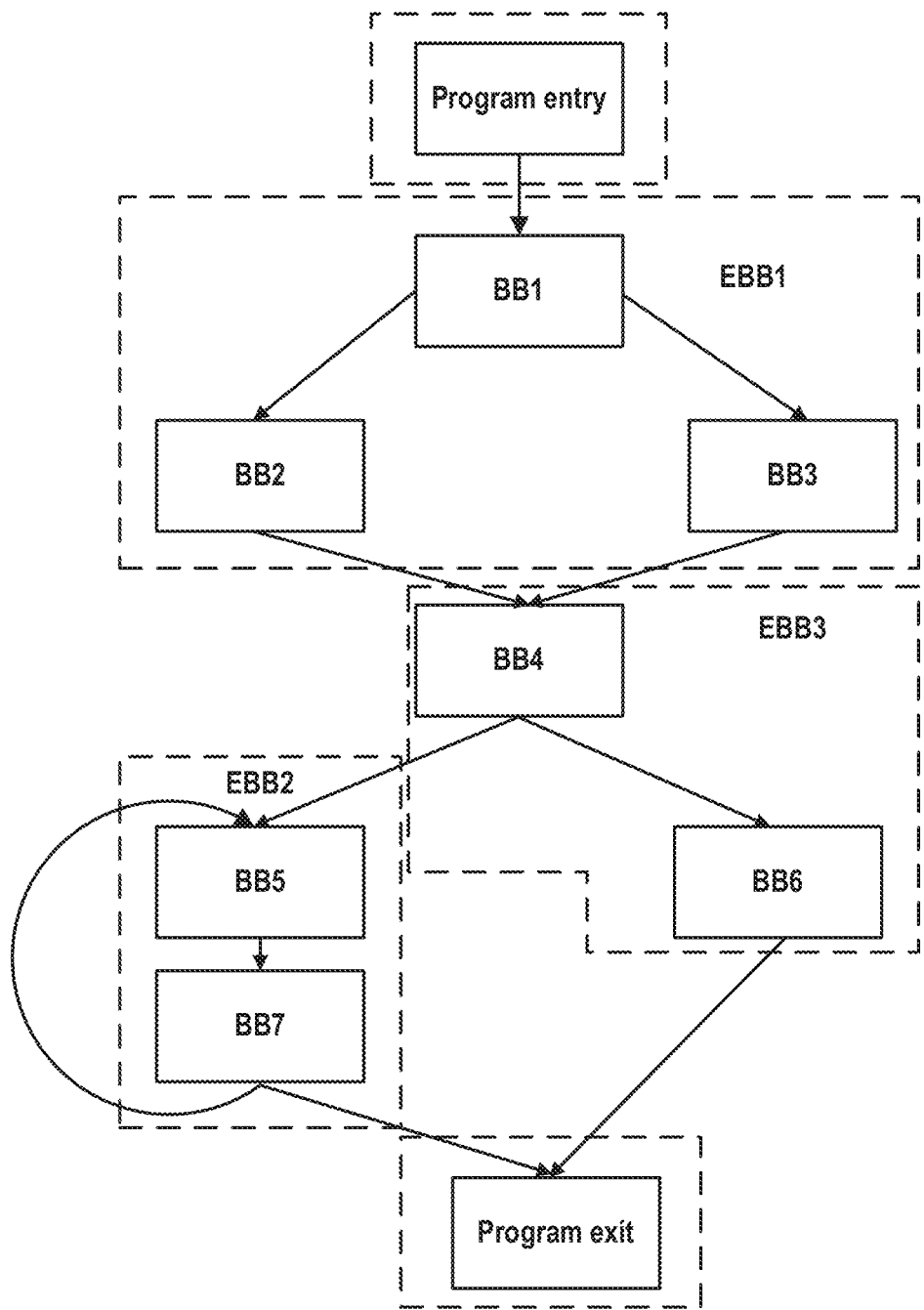
FIG. 3 shows a terminology model graph of basic blocks and extended basic blocks.

FIG. 3 shows a terminology model graph of basic blocks and extended basic blocks. With reference to FIG. 3, a basic block BB refers to the longest linear instruction sequence which can only enter from the first instruction of the program and leave from the last instruction; the instruction sequence of basic blocks BB is linear, i.e., a series of instructions are executed in sequence; for example, BB1-BB7 in FIG. 3 are all basic blocks. The program code as a whole is a tree structure formed by a plurality of connected basic blocks, wherein the tree structure comprises branch basic blocks which are basic blocks having a plurality of subsequent basic blocks, for example, basic block BB1 and basic block BB4 in FIG. 3. It further comprises join basic blocks which are basic blocks having a plurality of antecedent basic blocks, for example, basic block BB4 in FIG. 3. An extended basic block EBB refers to the longest instruction sequence starting from an entry instruction. This instruction sequence does not contain any join basic blocks other than the first basic block of the program. Because an extended basic block EBB only has one entry basic block and possibly has a plurality of exit basic blocks, it may be regarded as a tree with the entry basic block as a root. FIG. 3 contains 3 EBBs, which are EBB1 {BB1, BB2, BB3}, EBB2 {BB5, BB7}, and EBB3 {BB4, BB6}, respectively. The partition of EBBs is determined by algorithm. A partition algorithm is a prior art, which will not be detailed here.

Generally speaking, an extended basic block EBB is a structure constructed by a compiler during an optimization phase. Most compilers, such as gcc, open64, can construct an extended basic block EBB during the program optimization phase. The EBB construction algorithms are plural, which will not be detailed here because they are not inventive points of the present invention. A compiler also generates debugging information. There are a plurality of debugging information formats, such as Dwarf, Stab, COFF, OMF, etc. Hereinafter, implementation of the present invention will be described with a standard Dwarf (Debugging With Attributed Record Formats) format of debugging information as an example, a reverse debugging approach using other debugging information format is similar and will not be detailed here.

The debugging information of Dwarf format comprises row number information, symbol table, basic block information, basic data types, source file directory and name, among other information, which may be invoked by the debugger. For example, the debugging information records memory addresses corresponding to variables and functions. The debugger may obtain the required information and print the values of the variables, etc. FIGS. 4a and 4b show an example of Dwarf. Here, FIG. 4a shows a debugging information entry in Dwarf debugging information. The debugging information entry is a basic unit of Dwarf; FIG. 4b shows an example of Dwarf format information as generated by the compiler, wherein ed_scoped/tests/ac. C in the first column <source> indicates the directory path location and program name of the source code of the program; row, col in the second column [row, col] indicate the row and column of the source code, respectively; the numeral value in the third column <PC> indicates the instruction address, and the numerical value in the fourth column <BB entry> indicates the entry address of the basic block; the entry address is just the address of the first instruction of the basic block, and instructions having the same basic block entry address belong to the same basic block, for example, in column 4 of FIG. 4, there are 6 rows of 0x10e, which indicates that the 6 sentences of program codes belong to the same basic block, wherein 0x10e is the entry address of the basic block; in column 4 of FIG. 4, there are 7 rows of 0x156, which indicates that the 7 sentences of program codes belong to the same basic block, wherein 0x156 is the entry address of the basic block, etc; and the words after // in the fifth column <new statement or basic block> are notation statements. It is seen that the existing debugging information as outputted by the compiler has contained information of a basic block; although an extended basic block EBB is also a structure constructed by the compiler during the optimization phase, it is not contained in the debugging information outputted by the compiler.

During implementation of step S201, it is required that the compiler stores the constructed EBB structure in the debugging information as outputted by the compiler. FIG. 5 schematically shows information of extended basic blocks as added in the debugging information according to one embodiment of the present invention; the information in FIG. 5 is actually adding a new column between the current fourth column and fifth column in FIG. 4, which indicates information of the extended basic blocks. According to FIG. 5, 0x100 and 0x362 are entry addresses of two extended basic blocks; the entry address of an extended basic block is the address of the first instruction of the extended basic block, i.e., the entry address of the first basic block contained in the extended basic block, wherein 0x100, 0x156, 0x184, 0x272 . . . are entry addresses of basic blocks.

In step S202, in response to the program entering into a reverse debugging, a reverse debugging checkpoint is set at an entry address of at least one extended basic block. The program entering into a reverse debugging may be set by the user through a command line; for a debugger having a graphical user interface, a special button may also be provided to enable the program to enter into the reverse debugging. The step of setting a reverse debugging checkpoint may also be automatically set by the debugger, i.e., adding a piece of trap instruction at the entry address of an extended basic block, which is similar to the implementation of adding a breakpoint in the prior art, except that the locations where the checkpoints are added are different. The debugger may obtain the entry addresses of all extended basic blocks of the program through searching the debugging information including the entry addresses of extended basic blocks as outputted by the compiler, and may add reverse debugging checkpoints at these entry addresses. For example, It may be searched out from the combination of FIGS. 4 and 5 that [247, 5] is an entry address of an extended basic block, and then a reverse debugging checkpoint is added just at this address. In another embodiment, only when the program is dynamically executed to a function, checkpoints are inserted at all EBB entries in the function.

The method of adding reverse debugging checkpoints at EBB entry addresses have many advantages theoretically: first, because the program can reach each instruction in an EBB from an entry instruction of the EBB, there is no need to worry that it is impossible to return to a reverse debugging target breakpoint from a reverse debugging checkpoint; second, accessibility of basic blocks can be implemented, because an extended basic block EBB comprises a group of basic blocks BBs, and each basic block BB in the extended basic block EBB is accessible from the entry basic block BB of the extended basic block EBB; finally, an extended basic block EBB extends basic blocks BBs, and each extended basic block EBB comprises at least one basic block BB; in this way, the insertion amount of reverse debugging checkpoints is greatly reduced, which reduces memory space and correspondingly reduces the temporal and spatial complexities.

In step S203, in response to the program reaching a set reverse debugging checkpoint, information required to be stored by debugging that corresponds to the debugging checkpoint is stored. The information required to be stored by the debugging includes, but not limited to, the values of registers and the values of relevant memory space; all values of registers and some changed values and all values of memory locations may be retained, or the values of some memory locations may be retained only. In one embodiment, a value of a register is the original value of the register of the current reverse debugging checkpoint, and the value of a relevant memory is an original value of a memory space with a change occurring between the current reverse debugging checkpoint and a next reverse debugging checkpoint. FIG. 6 shows an embodiment of information required to be stored by a debugger at a reverse debugging checkpoint. At checkpoint 1, original values of all registers r1-r32 at the reverse debugging checkpoint 1 are stored, and when the program is executed to the third instruction, the value of memory 1 will change, and then the debugger sets via a system call the memory for the currently debugged process to be unwritable, in this way, when an instruction comes to write the memory, the system interrupts, and at this point, the original value of memory 1 may be stored in the information required to be stored by the debugger at the reverse debugging checkpoint, i.e., the original value of memory 1 between the reverse debugging checkpoint 1 and the reverse debugging checkpoint 2 at the moment of reverse debugging checkpoint 1. Likewise, at the checkpoint 2, the original values of all registers r1-r32 at the reverse debugging checkpoint 2 are stored, and memory 4 changes at the 12th instruction, and the original value 12 of memory 4 between the reverse debugging checkpoint 2 and the reverse debugging checkpoint 3 at the reverse debugging checkpoint 2 is recorded.

Here, the information required to be stored by debugging may be stored in a plurality of manners, for example, if the memory space occupied by the information required to be stored is not large, a block of protection memory may be specially partitioned to prevent other programs from operating this block of memory and modifying such information; if the required memory space is very large, a non-volatile memory may also be adopted to store, for example, storage mediums such as hard disk, optical disk, and electronic disk, etc.

In step S204, in response to receiving a set reverse debugging target breakpoint, the program returns to a reverse debugging checkpoint that is located before the reverse debugging target breakpoint and nearest to the reverse debugging target breakpoint, obtains the information required to be stored by debugging stored by the reverse debugging checkpoint and continues to execute till the reverse debugging target breakpoint. The information required to be stored by the debugging stored by the reverse debugging checkpoint mainly comprises the memory values and register values stored at the reverse debugging checkpoint; these values are related to which values are stored by the debugger; if all register original values and relevant memory original values are stored, it is only required to restore the memory value and register value as stored at the reverse debugging checkpoint; if they are stored according to the storage manner as shown in FIG. 6, when the information required to be stored by the debugging at the reverse debugging checkpoint k is restored, it is required to restore all information required to be stored by the debugging stored at the reverse debugging checkpoints n, n−1, . . . , k+1, k, such that the original values of relevant memory locations and all registers at the reverse debugging checkpoint k can be restored reversely and step by step from the checkpoint n, wherein k and n are both positive integers, and n>k. Relevant here refers to memory space related to the program.

In one embodiment, in response to receiving a set reverse debugging target breakpoint, an instruction corresponding to the reverse debugging target breakpoint is replaced by an interruption instruction, and the original instruction is stored; when the program continues execution, the original instruction is restored, such that the instruction sequence will not be changed. In other words, the instruction address is changed, such that interruption may occur when the program is executed to the instruction, and the program stops execution; the user may observe relevant information, for example, information of register and memory, etc.

Figure 7:
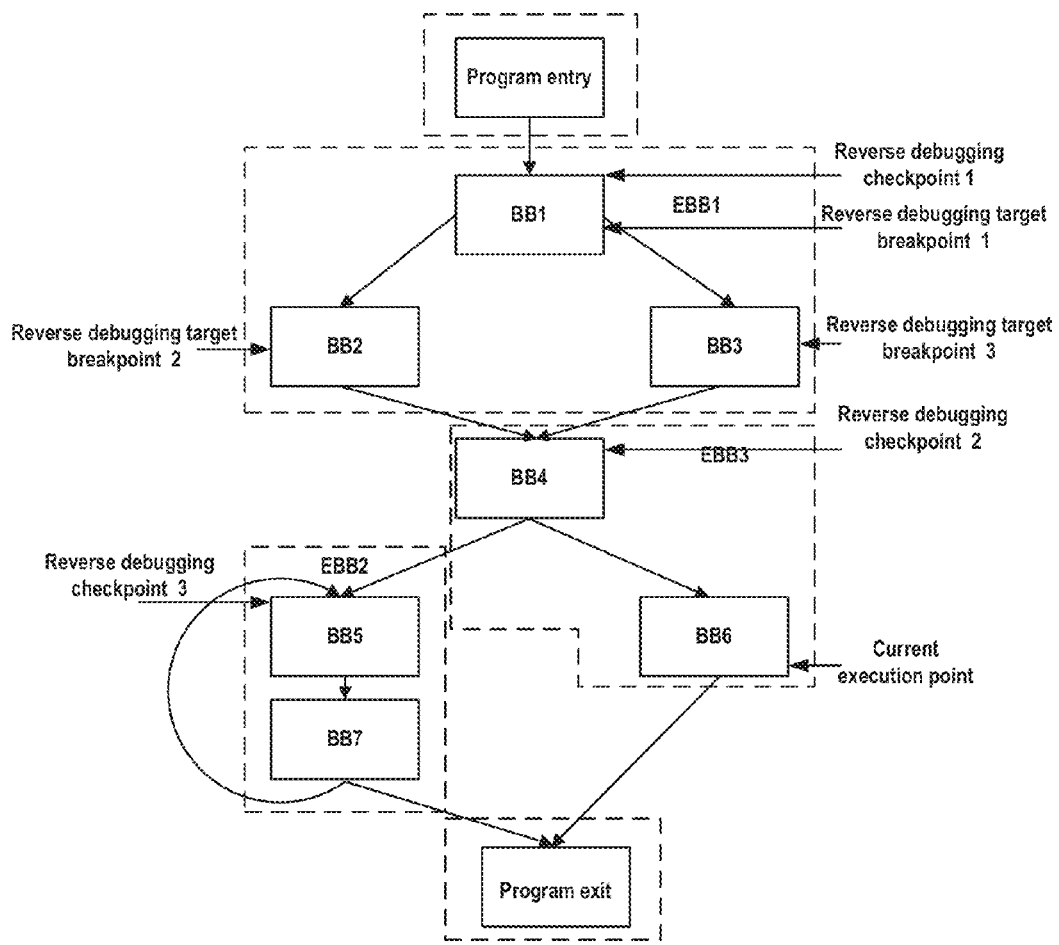
FIG. 7 shows basic blocks BBs and extended basic blocks EBBs as executed in the program of FIG. 3 and added target debugging breakpoints.

In one embodiment, in response to the received set reverse target breakpoints being plural, a latest executed reverse debugging target breakpoint among the plurality of reverse debugging target breakpoints is obtained, and then the program returns to a reverse debugging checkpoint that is located before the latest executed reverse debugging target checkpoint and nearest to the target reverse debugging breakpoint of the latest executed reverse debugging, and the initial memory value and register value as stored at the checkpoint are restored; reverse execution of the program is continued till the earliest executed reverse debugging target breakpoint. The latest executed reverse debugging target breakpoint cannot be compared with the instruction addresses of all reverse debugging target breakpoints, because the instructions comprise jump instructions, and it is not the case that an instruction with a smaller instruction address must be executed earlier and an instruction with a larger instruction address must be executed later. Based on the fact that a BB is composed of a set of instruction sequences, the instruction with a smaller instruction address in a BB must be executed earlier than an instruction with a larger instruction address in the same BB, and for two BBs in an EBB, an instruction in the parent BB must be executed earlier than an instruction in the child BB, which may be determined through the following approach: obtaining and storing execution sequences of EBBs and relationships between BBs included in the EBBs; for any two reverse debugging target breakpoints, if they belong to different EBBs, obtaining their execution sequences based on the execution sequences of the EBBs where they are located; if they belong to the same EBB and further belong to the same BB, their execution sequences are obtained based on their address sizes; if they belong to the same EBB but belong to different BBs, their execution sequences are determined based on the parent-and-child relationship of the BBs where they are located with respect to the EBB, i.e., a breakpoint belonging to the parent BB is executed earlier than the child BB, thereby obtaining the latest executed reverse debugging target breakpoint. The execution sequence of EBBs may be stored through an executed EBB chain. The above technical solution is mainly because a function comprises a plurality of extended basic blocks EBBs, while an extended basic block EBB comprises a plurality of basic blocks BBs; on the execution path, not all basic blocks BBs are executed. For example, FIG. 7 shows the basic blocks BBs and extended basic blocks EBBs as executed in the program of FIG. 3 as well as the added target debugging breakpoints; in FIG. 7, there are 7 basic blocks BBs, where only BB1, BB2, BB4, and BB6 are executed (grey blocks); further, not all EBBs are executed; in FIG. 7, only EBB1 and EBB3 among the three EBBs are executed. A program entry point must be an EBB entry point. In another embodiment, the execution sequences of EBBs and the BBs executed in the EBBs are recorded; in response to receiving the set reverse debugging target breakpoint, based on the stored execution sequences of EBBs and the BBs executed in the EBBs, it is determined as being unable to reversely be debugged, and an alarm is issued. Specifically speaking, whether the target breakpoint may be reversely executed is determined based on the instruction address of the reverse debugging target breakpoint and the instruction address scope of executed EBBs; if it cannot be executed reversely, the user may be alarmed. In the program as shown in FIG. 7, three reversely debugged breakpoints are set, which are located in basic blocks BB1, BB2, and BB3, respectively. Here in FIG. 7, the reverse debugging target breakpoint 3 is a breakpoint that cannot be executed by reverse debugging.

Because a situation which a programmer frequently encounters is that only a small segment of program is problematic, the programmer has to repetitively set a reverse debugging breakpoint in the small segment of program for performing reverse debugging; besides, if the user only reversely performs one step, the debugger is also required to first restore to the set reverse debugging checkpoint; as a result, the execution efficiency of the program is very low; thus, in one embodiment of step S204, when the program is continuously executed till the reverse debugging target breakpoint, technique of a one-step-one-stop approach in the prior art may be used for each instruction between a reverse checkpoint that is returned to, located before the reverse debugging target breakpoint and nearest to the reverse debugging target breakpoint and the target debugging breakpoint; a reverse debugging checkpoint is set for each instruction, and the information required to be stored by the debugging that corresponds to the reverse debugging checking point is stored. In this way, when the programmer repetitively sets a target breakpoint for reverse debugging in this segment of program, in response to receiving a further set reverse debugging target breakpoint and the set reverse debugging target breakpoint being located between the reverse debugging checkpoint that is located before the reverse debugging target breakpoint to which the program returned and nearest to the reverse debugging target breakpoint and the reverse debugging target breakpoint, the program returns to a further reverse debugging checkpoint corresponding to a preceding instruction of the further reverse debugging target breakpoint, and obtains information required to be stored by the debugging stored at the further reverse debugging checkpoint. In this way, debugging efficiency can be improved.

An existing debugger supporting reverse debugging has provided some reverse debugging commands, for example, the command set reverse=1 indicates setting a reverse debugging; the command Reverse-next indicates reversely executing to a preceding statement; the command Reverse-continue indicates reversely continuing to execute the command; the applied scenario comprises setting a reverse debugging target breakpoint, and the user desires that the program may return to this point in the future; after this reverse debugging target breakpoint is set, the user can execute forwardly; when the user intends to return to a previously set reverse debugging target breakpoint, the reverse-continue instruction can be executed such that the program may return to the latest executed reverse debugging target breakpoint.

By adopting the method according to the present invention, a further plurality of reverse debugging commands may be further set in the debugger, for example: setting the command Show checkpoints to show which reverse debugging checkpoints are automatically set by the debugger, and the results of the command may be possibly shown as:

1) checkpoint 1: address 1, source line 1;
2) checkpoint 2: address 2, source line 2;
3) checkpoint 3: address 3, source line 3.

A command find Checkpoint for [breakpoint]: may also be set to indicate searching a reverse debugging checkpoint nearest to the reverse debugging target breakpoint [breakpoint], wherein [breakpoint] is the reverse debugging target breakpoint.

The above added commands may be command line commands; if the debugger has a graphical user interface, a button of the corresponding graphical user interface may be designed to implement the above command, etc.

Figure 8:
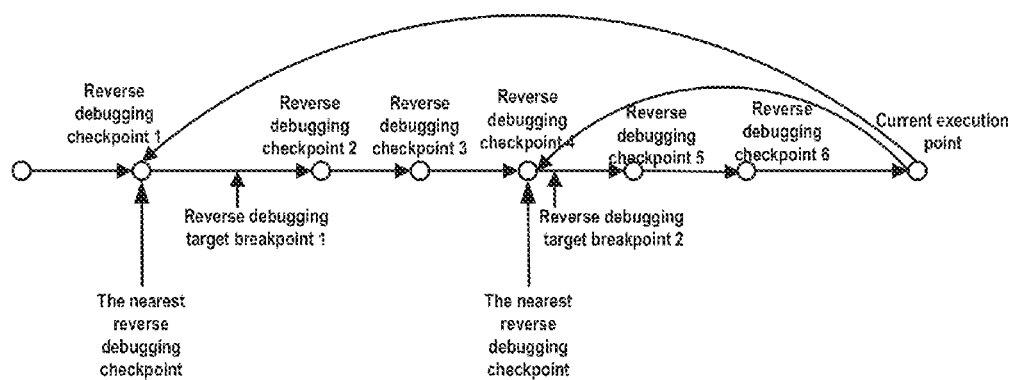
FIG. 8 shows a scenario of using the debugging method of FIG. 2.

FIG. 8 shows an application scenario of the debugging method of FIG. 2. In FIG. 8, the user decides to enter into the reverse debugging mode through executing the command "set reverse=1." The program comprises 6 extended basic blocks; the debugger automatically sets 6 reverse debugging checkpoints at the entry address of each extended basic block; the user continues to execute the program, and stores information required to be stored by debugging at each reverse debugging checkpoint during the execution process; when the program is executed to the current execution point, it is determined to return to some previous execution points. If the user sets two reverse debugging target breakpoints, the debugging method finds that with respect to the reverse debugging target breakpoint 2, the reverse debugging checkpoint 4 is a reverse debugging checkpoint that is located nearest to and before the reverse debugging target breakpoint 2; then the debugging method will restore the information required to be stored by the debugging stored at the reverse debugging checkpoint 4 and continue execution till the reverse debugging target breakpoint 2. Here, the user may use a debugging command. Then, the execution scenario of the reverse debugging target breakpoint 1 is similar, and it will not be detailed here.

Figure 9:
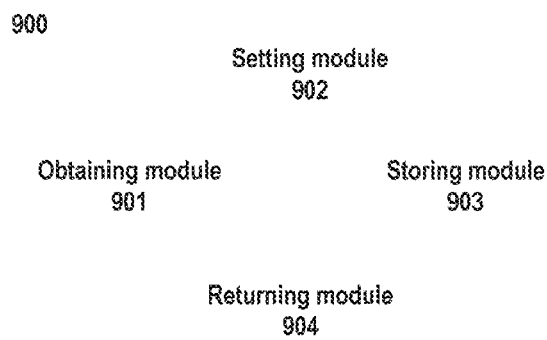
FIG. 9 shows a structural block diagram of a reverse debugger 900.

Under the same inventive concept, the present invention further discloses a reverse debugger. FIG. 9 shows a structural block diagram of a reverse debugger 900. According to FIG. 9, the reverse debugger comprises: an obtaining module 901 configured to obtain debugging information of a program outputted by a compiler, the debugging information including information related to extended basic blocks of the program; a setting module 902 configured to in response to the program entering into reverse debugging, set a reverse debugging checkpoint at an entry address of at least one extended basic block; a storing module 903 configured to in response to the program reaching a set reverse debugging checkpoint, store information required to be stored by debugging that corresponds to the checkpoint; a returning module 904 configured to in response to receiving a set reverse debugging target breakpoint, make the program return to a reverse checkpoint that is located before the reverse debugging target breakpoint and nearest to the reverse debugging target breakpoint, obtain the information required to be stored by debugging stored at the reverse debugging checkpoint, and continue to execute the program till the reverse debugging target breakpoint.

In one embodiment, the information related to the extended basic blocks is constructed by the compiler and stored in debugging information outputted by the compiler.

In one embodiment, the information required to be stored by debugging at least comprises an original value of a register and a value of a memory space. In another embodiment, the value of the register is an original value of a register at the current checkpoint, and the value of the memory space is an original value of a memory space with change occurring between the current checkpoint and a next checkpoint. Moreover, in still another embodiment, the returning module obtaining the information required to be stored by the debugging stored at the checkpoint comprises: in response to necessity to restore the information required to be stored by debugging at the reverse debugging checkpoint k, restoring information required to be stored by debugging stored at reverse debugging checkpoints n, n−1, . . . , k+1, k, and starting from the reverse debugging checkpoint n, restoring reversely and step by step original values of relevant memory locations and all registers at the checkpoint k, wherein k and n are positive integers, and n>k.

In one embodiment, the returning module is further configured to: in response to the received set reverse debugging target breakpoints being plural, obtain a latest executed reverse debugging target breakpoint, and then make the program return to a reverse debugging checkpoint that is located before the latest executed reverse debugging target breakpoint and nearest to the target breakpoint of the latest executed reverse debugging, restore the initial memory values and register values as stored by the reserve debugging checkpoint; and continue reverse execution of the program till the earliest executed reverse debugging target breakpoint.

In one embodiment, the returning module is configured to obtain the latest executed reverse debugging target breakpoint among the plurality of reverse debugging target breakpoints through the following steps: obtaining and storing the execution sequences of EBBs and the relationships between the BBs included in the EBBs; for any two reverse debugging target breakpoints, if they belong to different EBBs, obtaining their execution sequences based on the execution sequences of the EBBs where they are located; if they belong to the same EBB and further belong to the same BB, obtaining their execution sequences based on their address sizes; if they belong to the same EBB but belong to different BBs, determining their execution sequences based on the parent-and-child relationship of the BBs where they are located with respect to the EBB, thereby obtaining the latest executed reverse debugging target breakpoint.

In one embodiment, the returning module is further configured to obtain and store the execution sequences of EBBs and the BBs executed in the EBBs; in response to receiving the set reverse debugging target breakpoints, based on the stored execution sequences of EBBs and the BBs executed in the EBBs, it is determined as being unable to be reversely debugged, and issue an alarm.

In one embodiment, the returning module continuing to execute the program till the reverse debugging target breakpoint is configured to set a reverse debugging checkpoint for each instruction from a reverse debugging checkpoint that returned before the reverse debugging target breakpoint, and nearest to reverse debugging target breakpoint to the target debugging breakpoint; in response to the program reaching a set reverse debugging checkpoint, store information required to be stored by the debugging that corresponds to the debugging checkpoint; in response to receiving a further set reverse debugging target breakpoint and the set reverse debugging target breakpoint being located between the reverse debugging checkpoint that returned before the reverse debugging target breakpoint, and nearest to reverse debugging target breakpoint and the reverse debugging target breakpoint, make the program return to a further reverse debugging checkpoint corresponding to a preceding instruction of the further reverse debugging target breakpoint, and obtain information required to be stored by the debugging stored at the further reverse debugging checkpoint.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of reversely debugging a program, comprising:
    obtaining debugging information of the program as outputted by a compiler, the debugging information comprising information related to extended basic blocks (EBBs) of the program;
    in response to the program entering into a reverse debugging, setting a reverse debugging checkpoint at an entry address of at least one extended basic block;
    in response to the program reaching a set reverse debugging checkpoint, storing information required to be stored by debugging that corresponds to the reverse debugging checkpoint;
    in response to receiving a set reverse debugging target breakpoint, making the program return to a reverse debugging checkpoint that is located before the reverse debugging target breakpoint and nearest to the reverse debugging target breakpoint, obtaining information required to be stored by the debugging stored at the reverse debugging checkpoint, and continuing to execute the program till the reverse debugging target breakpoint.

2. The method according to claim 1, wherein the information related to the extended basic blocks is constructed by the compiler and stored in the debugging information outputted by the compiler.

3. The method according to claim 1, wherein the information required to be stored by the debugging at least comprises a value of a register and a value of relevant memory space.

4. The method according to claim 3, wherein the value of the register is an original value of a register at the current reverse debugging checkpoint, and the value of the relevant memory space is an original value of memory space with change occurring between the current reverse debugging checkpoint and a next reverse debugging checkpoint.

5. The method according to claim 4, wherein the obtaining information required to be stored by debugging stored at the checkpoint comprises:
    in response to necessity to restore the information required to be stored by the debugging at a reverse debugging checkpoint k, restoring information required to be stored by the debugging stored at reverse debugging checkpoints n, n−1, . . . , k+1, k, and starting from the reverse debugging checkpoint n, restoring reversely and step by step original values of relevant memory locations and all registers at the checkpoint k, wherein k and n are positive integers, and n>k.

6. The method according to claim 1, further comprising in response to the received set reverse debugging target breakpoints being plural:
    obtaining a latest executed reverse debugging target breakpoint,
    making the program return to a reverse debugging checkpoint that is located before the latest executed reverse debugging target breakpoint and nearest to the latest executed reverse debugging target breakpoint,
    restoring initial values of memory and register stored at the reverse debugging checkpoint,
    continuing to reversely execute the program till an earliest executed reverse debugging target breakpoint.

7. The method according to claim 6, wherein the obtaining the latest executed reverse debugging target breakpoint among multiple reverse debugging target breakpoints comprises:
    obtaining and storing execution sequences of EBBs and relationships between BBs included in the EBBs;
    for any two reverse debugging target breakpoints, obtaining execution sequences of target breakpoints based on one of following items:
        1) in case the two reverse debugging target breakpoints belong to different EBBs, obtaining their execution sequences based on the execution sequences of the EBBs where they are located;

2) in case the two reverse debugging target breakpoints belong to the same EBB and further belong to the same BB, obtaining their execution sequences based on their address sizes;

3) in case the two reverse debugging target breakpoints belong to the same EBB but belong to different BBs, obtaining their execution sequences based on a parent-and-child relation, in the EBB, of the BBs where they are located.

8. The method according to claim 1, further comprising:
obtaining and storing execution sequences of EBBs and BBs executed in the EBBs;
in response to the set reverse debugging target breakpoint being determined as unable to be reversely debugged based on the execution sequences of the stored EBBs and the BBs executed in the EBBs, issuing an alarm.

9. The method according to claim 1, wherein the continuing to execute the program till the reverse debugging target breakpoint comprises:
setting a reverse debugging checkpoint for each instruction from a reverse debugging checkpoint that is returned to, located before the reverse debugging target breakpoint, and nearest to the reverse debugging target breakpoint, to the target debugging breakpoint;
in response to the program reaching the set reverse debugging checkpoint, storing information required to be stored by debugging that corresponds to the checkpoint;
in response to receiving a further set reverse debugging target breakpoint and the set reverse debugging target breakpoint being located between the reverse debugging checkpoint that is returned to, located before the reverse debugging target breakpoint, and nearest to the reverse debugging target breakpoint, and the reverse debugging target breakpoint, making the program return to a further reverse debugging checkpoint corresponding to a preceding instruction of the further reverse debugging target breakpoint, and obtaining information required to be stored by the debugging stored at the further reverse debugging checkpoint.

10. A reverse debugger, comprising:
an obtaining module configured to obtain debugging information of a program as outputted by a compiler, the debugging information comprising information related to extended basic blocks (EBBs) of the program;
a setting module configured to in response to the program entering into a reverse debugging, set a reverse debugging checkpoint at an entry address of at least one extended basic block;
a storing module configured to in response to the program reaching a set reverse debugging checkpoint, store information required to be stored by debugging that corresponds to the reverse debugging checkpoint;
a returning module configured to in response to receiving a set reverse debugging target breakpoint, make the program return to a reverse debugging checkpoint that is located before the reverse debugging target breakpoint and nearest to the reverse debugging target breakpoint, obtain information required to be stored by the debugging stored at the reverse debugging checkpoint, and continue to execute the program till the reverse debugging target breakpoint.

11. The reverse debugger according to claim 10, wherein the information related to the extended basic block is constructed by the compiler and stored in the debugging information outputted by the compiler.

12. The reverse debugger according to claim 10, wherein the information required to be stored by the debugging at least comprises a value of a register and a value of relevant memory space.

13. The reverse debugger according to claim 12, wherein the value of the register is an original value of a register at the current reverse debugging checkpoint, and the value of the relevant memory space is an original value of memory space with change occurring between the current reverse debugging checkpoint and a next reverse debugging checkpoint.

14. The reverse debugger according to claim 13, wherein the returning module obtaining information required to be stored by debugging stored at the checkpoint comprises:
in response to necessity to restore the information required to be stored by the debugging at a reverse debugging checkpoint k, restoring information required to be stored by the debugging stored at reverse debugging checkpoints n, n−1, . . . , k+1, k, and starting from the reverse debugging checkpoint n, restoring reversely and step by step original values of relevant memory locations and all registers at the checkpoint k, wherein k and n are positive integers, and n>k.

15. The reverse debugger according to claim 10, wherein the returning module is further configured to in response to the received set reverse debugging target breakpoints being plural:
obtain a latest executed reverse debugging target breakpoint,
make the program return to a reverse debugging checkpoint that is located before the latest executed reverse debugging target breakpoint and nearest to the latest executed reverse debugging target breakpoint,
restore initial values of memory and register stored at the reverse debugging checkpoint,
continue to reversely execute the program till an earliest executed reverse debugging target breakpoint.

16. The reverse debugger according to claim 15, wherein the returning module is configured to obtain the latest executed reverse debugging target breakpoint among multiple reverse debugging target breakpoints through the following steps:
obtaining and storing execution sequences of EBBs and relationships between BBs included in the EBBs;
for any two reverse debugging target breakpoints, obtaining execution sequences of target breakpoints based on one of following items:
1) in case the two reverse debugging target breakpoints belong to different EBBs, obtaining their execution sequence based on the execution sequences of the EBBs where they are located;
2) in case the two reverse debugging target breakpoints belong to the same EBB and further belong to the same BB, obtaining their execution sequences based on their address sizes;
3) in case the two reverse debugging target breakpoints belong to the same EBB but belong to different BBs, obtaining their execution sequences based on a parent-and-child relation, in the EBB, of the BBs where they are located.

17. The reverse debugger according to claim 10, wherein the returning module is further configured to:
obtain and store execution sequences of EBBs and BBs executed in the EBBs;
in response to the set reverse debugging target breakpoint being determined as unable to be reversely debugged based on the execution sequences of the stored EBBs and the BBs executed in the EBBs, issuing an alarm.

18. The reverse debugger according to claim 10, wherein the returning module continuing to execute the program till the reverse debugging target breakpoint is configured to:
- set a reverse debugging checkpoint for each instruction from a reverse debugging checkpoint that is returned to, located before the reverse debugging target breakpoint, and nearest to the reverse debugging target breakpoint, to the target debugging breakpoint;
- in response to the program reaching the set reverse debugging checkpoint, store information required to be stored by debugging that corresponds to the checkpoint;
- in response to receiving a further set reverse debugging target breakpoint and the set reverse debugging target breakpoint being located between the reverse debugging checkpoint that is returned to, located before the reverse debugging target breakpoint, and nearest to the reverse debugging target breakpoint, and the reverse debugging target breakpoint, make the program return to a further reverse debugging checkpoint corresponding to a preceding instruction of the further reverse debugging target breakpoint, and obtain information required to be stored by the debugging stored at the further reverse debugging checkpoint.

* * * * *